United States Patent [19]
Nakajima et al.

[11] Patent Number: 5,657,015
[45] Date of Patent: Aug. 12, 1997

[54] METHOD AND APPARATUS OF RATE CONVERSION FOR CODED VIDEO DATA

[75] Inventors: Yasuyuki Nakajima, Saitama; Hironao Hori, Tokyo; Tamotsu Kanoh, Saitama, all of Japan

[73] Assignee: Kokusai Denshin Denwa Kabushiki Kaisha, Tokyo, Japan

[21] Appl. No.: 544,885

[22] Filed: Oct. 18, 1995

[30] Foreign Application Priority Data

Mar. 9, 1995 [JP] Japan .................................. 7-077100

[51] Int. Cl.$^6$ .................................................. H03M 7/40
[52] U.S. Cl. ............................................................ 341/61
[58] Field of Search .................... 341/61, 200; 358/433, 358/426

[56] References Cited

U.S. PATENT DOCUMENTS 5,412,484  5/1995  Yoshikawa .................. 358/433

OTHER PUBLICATIONS

"Consideration on Bitrate Conversion", ITE Annual Convention '94, pp. 183–184 (in Japanese and English).

*Primary Examiner*—Brian K. Young
*Attorney, Agent, or Firm*—Westman, Champlin & Kelly, P.A.

[57] ABSTRACT

Picture coded data that are obtained by coding at a coding rate R1 that is input via a coded data input terminal 1 are supplied to a variable length decoder. The variable length decoder decodes data for which variable length coding has been performed, and DCT coding information is transmitted to an inverse quantizer. A quantization controller calculates a quantization step that is necessary for re-quantization, and controls a quantizer. The DCT coding information for which the inverse quantization has been performed by the inverse quantizer is recovered into a DCT coefficient. The DCT coefficient is quantized again by a quantizer at quantization step Q that is determined by the quantization controller, and the result is transmitted to a variable length coder. The variable length coder performs variable length coding of the received data at a coding rate R2, and outputs the resultant picture coded data to a coded data output terminal. In this manner, a rate conversion apparatus for picture coded data can be provided that employs simpler means than does the transcoding that provides the same performance as does transcoding.

9 Claims, 8 Drawing Sheets

71 COEFFICIENT MATRIX

| 300 | 200 | 100 | 50 |
|---|---|---|---|
| 250 | 280 | 120 | 40 |
| 160 | 140 | 130 | 30 |
| 80 | 60 | 50 | 20 |

÷

72 QUANTIZATION MATRIX

| 16 | 32 | 64 | 128 |
|---|---|---|---|
| 32 | 64 | 128 | 256 |
| 64 | 128 | 256 | 512 |
| 128 | 256 | 512 | 512 |

73

| 300/16 | 200/32 | 100/64 | 50/128 |
|---|---|---|---|
| 250/32 | 280/64 | 120/128 | 40/256 |
| 160/64 | 140/128 | 130/256 | 30/512 |
| 80/128 | 60/256 | 50/512 | 20/512 |

=

74 QUANTIZED COEFFICIENT MATRIX (74a)

| 18 | 6 | 1 | 0 |
|---|---|---|---|
| 7 | 4 | 0 | 0 |
| 2 | 1 | 0 | 0 |
| 0 | 0 | 0 | 0 |

75 ZIG-ZAG SCAN MATRIX

| 0 | 1 | 5 | 6 |
|---|---|---|---|
| 2 | 4 | 7 | 12 |
| 3 | 8 | 11 | 13 |
| 9 | 10 | 14 | 15 |

76

| 18 | 6 | 7 | 2 | 4 | 1 | 0 | 0 | 1 | EOB |

TO ENTROPY CODER

METHOD AND APPARATUS OF RATE CONVERSION FOR CODED VIDEO DATA

BACKGROUND OF THE INVENTION

1. Field of the Invention

The present invention relates to a method for rate conversion of coded video data and to an apparatus for the performance of the conversion; and relates in particular to a method, for rate conversion of coded video data, whereby an apparatus that records, transfers, and displays a digital moving picture requires but a simple arrangement to perform rate conversion which involves little degradation of pictures, and to an apparatus by which the method is applied.

2. Description of the Related Art

Conventional examples of highly efficient coding for moving pictures are standards methods for moving picture coding that are proposed by the ISO (International Organization For Standardization) and the JTC (Joint Technical Committee) of the IEC (International Electrotechnical Commission), i.e., MPEG1 (Moving Pictures Experts Group) and MPEG2. When the MPEG coding system is employed, a television signal is converted into coded data with a transfer speed of 1 Mbit/s to several tens of Mbit/s, in consonance with a picture quality, and is accumulated on a computer hard disk or is transmitted over a LAN (Local Area Network).

Since usable transfer speeds vary across a transfer path, such as the Internet or an ISDN, according to the busyness of lines and the contracted line speed, requests for the transfer of moving pictures are made at various speeds. Therefore, there is one technique, for example, whereby when coded data that are temporarily accumulated are present, the data are decoded to recover a picture and coding is again performed in consonance with a required transfer speed.

This technique is called a transcoding system. The outline of the transcoding system will be explained while referring to FIG. 11.

Figure 11:
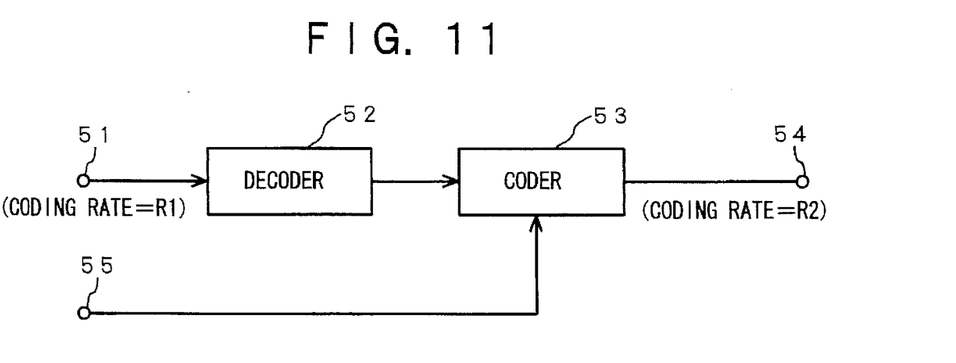
FIG. 11 is a block diagram illustrating the arrangement of a coding rate conversion apparatus as prior art 1.

As is shown in FIG. 11, data that are coded at a coding rate R1 that is input at a coded data input terminal 51 are temporarily decoded into a picture by a decoder 52. The picture is then transmitted to a coder 53, and is coded again at a coding rate that is input via a coding rate input terminal 55. The coded data are output, via a coded data output terminal 54, as data whose coding rate has been changed to R2.

On the other hand, there are techniques whereby coding rate conversion is performed on coded data without decoding coded data into a picture. One such techniques is described in "The Study Of A Coding Rate Conversion System," by Matsumoto and Kimura, 1994 ITEJ (The Institute of Television Engineers of Japan) Annual Convention, pp. 183 to 184. This system will be briefly explained while referring to FIG. 12.

Figure 12:
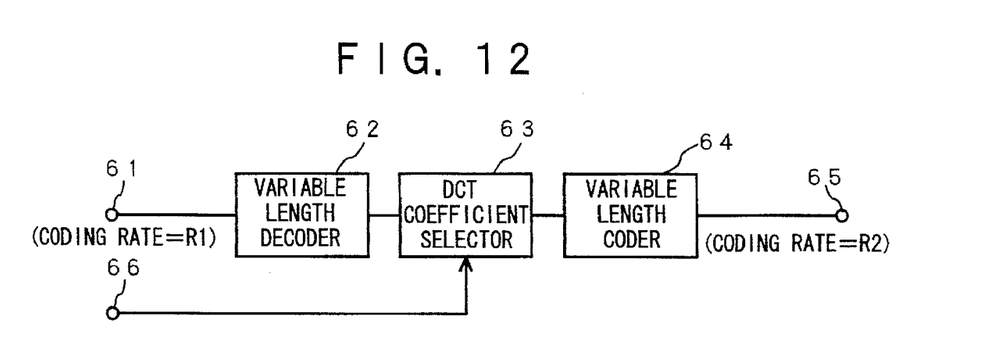
FIG. 12 is a block diagram illustrating the arrangement of a coding rate conversion apparatus as prior art 2.

As is shown in FIG. 12, a variable length decoder 62 extracts DCT (Discrete Cosine Transform) coding information from data that have been coded at a coding rate R1 that is input via a coded data input terminal 61. One part of the DCT coding information is selected and the remainder is deleted by a DCT coefficient selector 63 in accordance with a coding rate that is input via a coding rate input terminal 66. The selected DCT coding information is coded by a variable length coder 64, and the resultant data is output, via a coded data output terminal 65, as coded data whose coding rate has been changed to R2. This system is called DCT coefficient partitioning.

Figure 13:
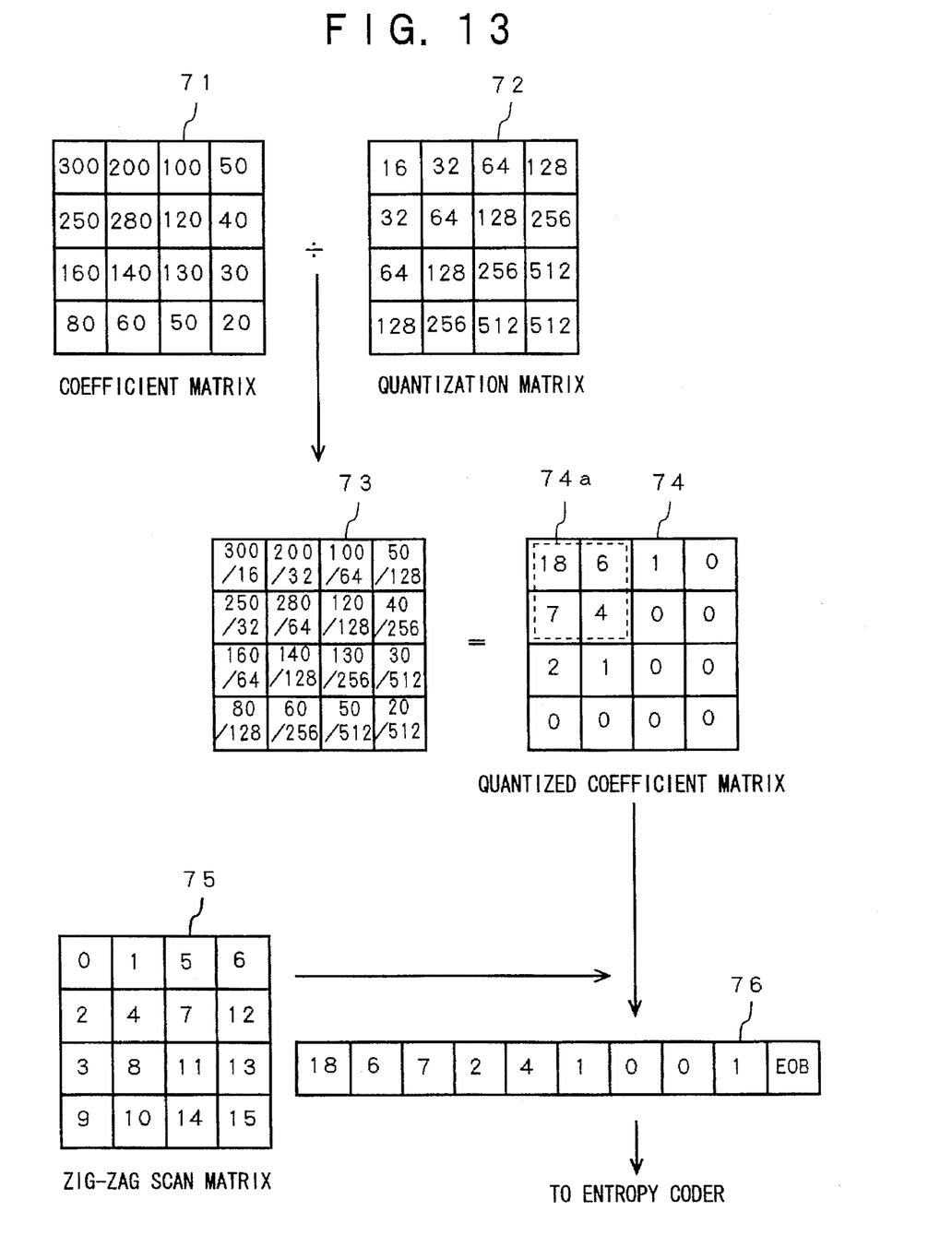
FIG. 13 is a diagram for explaining the outline of a conventional coding process.

The DCT coefficient partitioning will be described in detail while referring to FIG. 13. Although a coding process is generally performed while employing an 8×8 pel grid as one block, for simplicity a 4×4 pel block is shown in FIG. 13. In FIG. 13, assuming that reference number 71 denotes a coefficient matrix that is obtained by performing a DCT process on a 4×4 pel block (not shown), the elements of the coefficient matrix 71 are divided by corresponding elements in a quantization matrix 72. The remainder of this division is omitted, and a quantized coefficient matrix 74 (i.e., the above described coded information) is acquired from the integer portion. The elements of the coded information 74 are rearranged in the order of the elements in a zig-zag scan matrix 75, and thus a quantized coefficient matrix 76 is acquired. Then, entropy coding is performed on the quantized coefficient matrix 76.

According to the DCT coefficient partitioning, the variable length decoder 62 decodes the data acquired by performing entropy coding while the DCT coefficient selector 63 selects, for example, only a part 74a of the coded information 74 and deletes the remainder of the coded information. In this manner, the DCT coded information 74a that was selected is coded by the variable length coder 64, and the resultant data are output, via the coded data output terminal 65, as coded data whose coding rate has been changed to R2.

According to the description in the above document, however, assuming that the original coding rate R1 is 6 Mbit/s and the converted rate R2 is 4 Mbit/s, the transcoding in MPEG2 is degraded by about 1.5 dB as compared with normal coding at 4 Mbit/s. The term normal coding means the coding that is ordinarily performed without rate conversion, i.e., the coding system in which a picture is directly coded by a coder. The transcoding requires the decoder 52 and the coder 53, so that the size of the arrangement for an apparatus is increased and the manufacturing cost of the apparatus is also raised.

Since the DCT coefficient partitioning can be obtained by using the variable length decoder 62, the DCT coefficient selector 63, and the variable length coder 64, the arrangement for an apparatus is very simple. According to the description in the above document, however, the DCT coefficient partitioning is degraded by about 3 dB compared with the results that are obtained with normal coding. Therefore, with the DCT coefficient partitioning, conversion causes a picture to be deteriorated very much. The cause of the deterioration in a picture is regarded as being the deletion of information other than the part 74a of the DCT coded information 74 in FIG. 13, for example.

SUMMARY OF THE INVENTION

It is one object of the present invention to provide a method, for the rate conversion of video data, whereby the above described shortcomings of the prior art are overcome and a means that is simpler than transcoding is employed to provide the same performance as that which is provided by transcoding, and to provide an apparatus for the employment of the method.

It is another object of the present invention to provide a method, for the rate conversion of video data, whereby a means that is simpler than transcoding is employed to obtain a higher efficiency for rate conversion than that which is provided by DCT coefficient partitioning, and to provide an apparatus for the employment of the method.

To achieve the above objects, according to the present invention, (1) a method, for the rate conversion of video coded data, comprises the steps of re-quantizing coded data obtained by performing inverse quantization, and of performing rate conversion at a quantization level; and (2) an apparatus, for the rate conversion of video data, comprises means for inversely quantizing coded data for a moving picture, means for re-quantizing coded data obtained by inverse quantization, and quantization control means for controlling a quantization step that is required for said re-quantization.

According to the present invention, since the rate conversion of coded video data can be performed without deleting the coded video data, a rate for coded data can be converted with minimum deterioration of a picture. Further, since the decoder and the coder that are employed in a conventional apparatus are not required, an apparatus that has a simple structure can be manufactured at a low cost.

DETAILED DESCRIPTION OF THE PREFERRED EMBODIMENTS

Figure 10A:
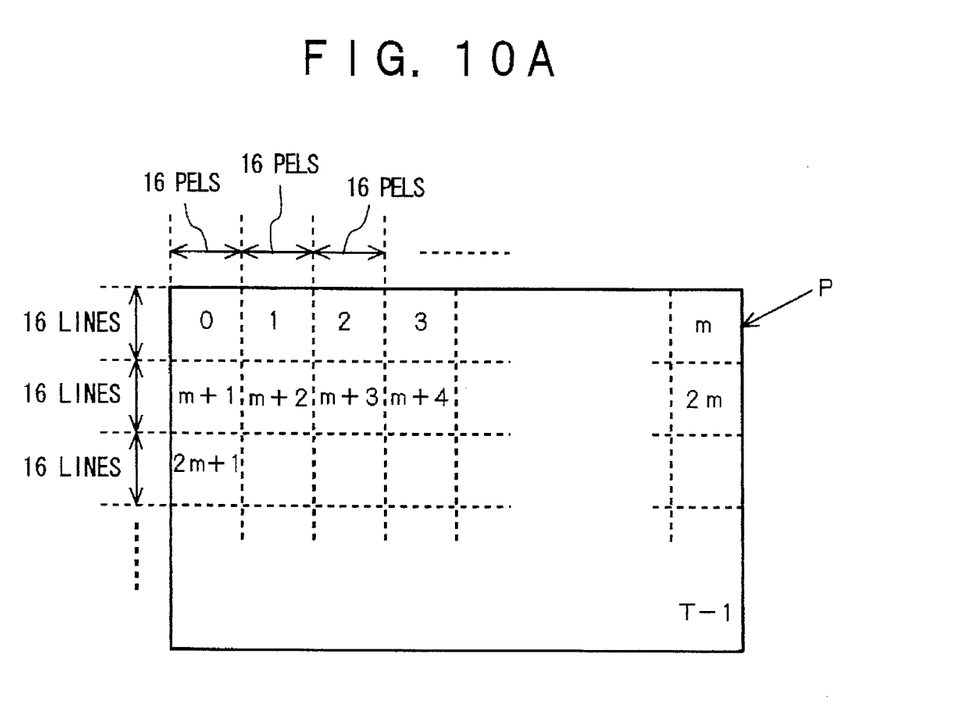
FIGS. 10A and 10B are diagrams for explaining the arrangement of a macro block.

The present invention will now be described in detail while referring to the accompanying drawings. Although the present invention can be applied to any video coding system for either still pictures or for moving pictures, in the following embodiment the MPEG coding method for moving pictures that uses the DCT will be explained. With MPEG, the DCT coding is performed for individual blocks of 8 pels × 8 lines. The quantization step is provided for each macro block. A macro block in MPEG1 consists of, for example, 16 pels × 16 lines, as is shown in FIG. 10A, and is constituted by four luminance blocks of 8 pels × 8 lines each and two chroma blocks of 8 pels × 8 lines.

Figure 1:
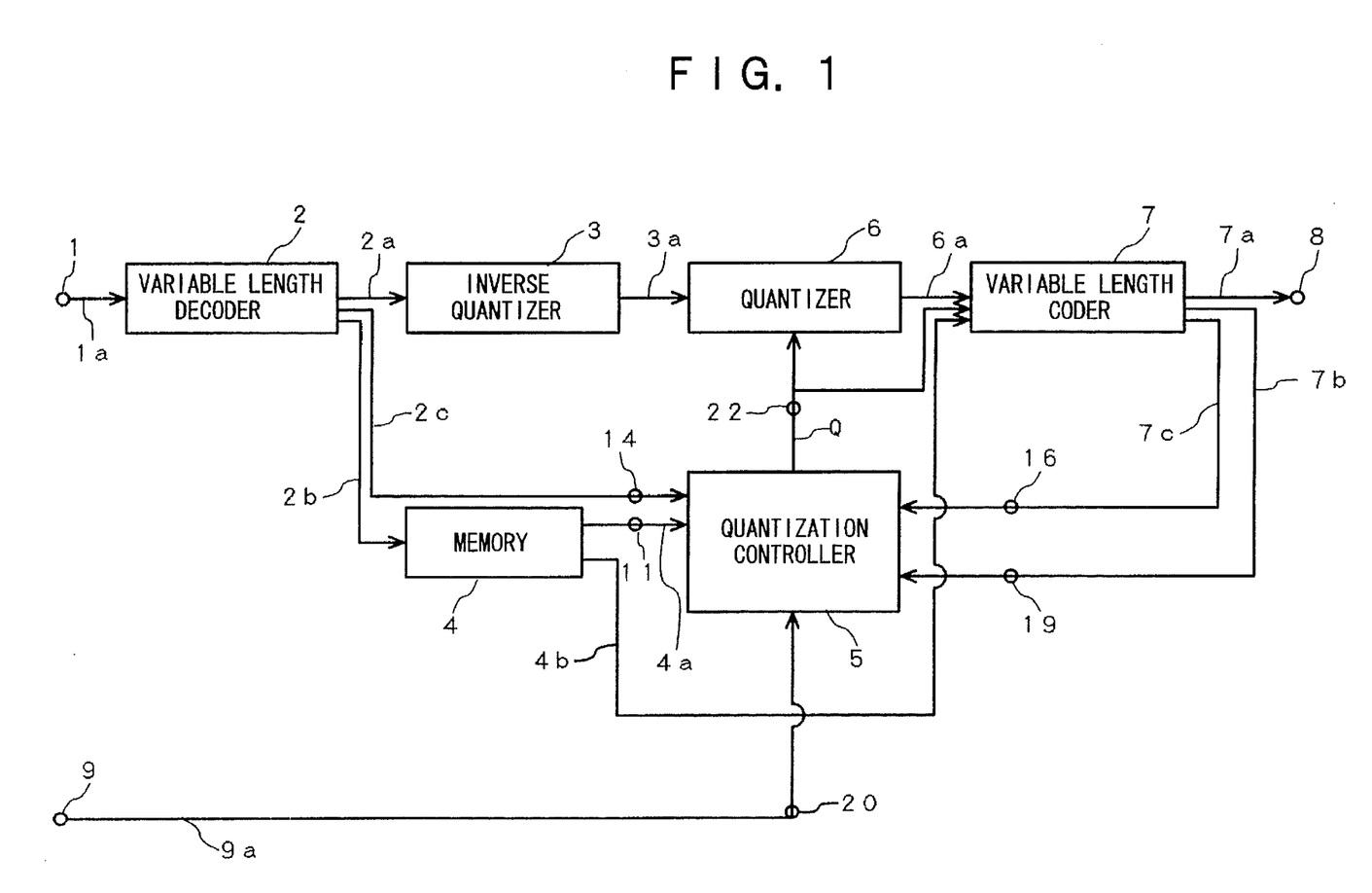
FIG. 1 is a block diagram illustrating the arrangement of an apparatus for coding rate conversion according to one embodiment of the present invention.

FIG. 1 is a block diagram illustrating a first embodiment of a rate conversion apparatus according to the present invention. Coded video data la that are input via a coded data input terminal 1 and that are coded at coding rate R1 are first transmitted to a variable length decoder 2. The variable length decoder 2 decodes the data for which variable length coding was performed. Here, DCT coding information 2a and quantization step information for each block are decoded. The DCT coding information 2a is forwarded to an inverse quantizer 3, while information (e.g., quantization step information and a motion vector) 2b, which is information other than the DCT coding information, is sent to a memory 4. The variable length decoder 2 counts the total bit count 2c in each picture, and the total bit count 2c is transmitted to a quantization controller 5.

The inverse quantizer 3 performs inverse quantization on the received DCT coding information 2a to recover a DCT coefficient 3a. The DCT coefficient 3a corresponds to the DCT coefficient matrix 71 in FIG. 13. The recovered DCT coefficient 3a is quantized again by a quantizer 6 at a quantization step Q that is determined by the quantization controller 5. The quantization controller 5 receives a quantization step 4a from the memory 4; the total bit count 2c before conversion from the variable length decoder 2; a total bit count 7b up to a conversion block after conversion and a quantization step 7c after conversion from a variable length coder 7; and a coding rate 9a from a coding rate input terminal 9.

DCT coding information 6a that is output by the quantizer 6 is transmitted to the variable length coder 7 with information 4b, such as a motion vector that is stored in the memory 4, that is other than the DCT coding information and the quantization step Q from the quantization controller 5. After variable length coding is performed on the DCT coding information 6a, the resultant information is output, from a coded data output terminal 8, as coded video data 7a that is obtained by coding at a coding rate R2. Reference numbers 11, 14, 16, 19, 20 and 22 are provided in FIG. 1 in order to clarify their relationship with the like numbers in FIG. 2.

The same system as is used for a decoder that conforms to the MPEG system can be employed for the variable length decoder 2 and the inverse quantizer 3. The same system as is used for a coder that conforms to the MPEG system can be employed for the quantizer 6 and the variable length coder 7.

Figure 2:
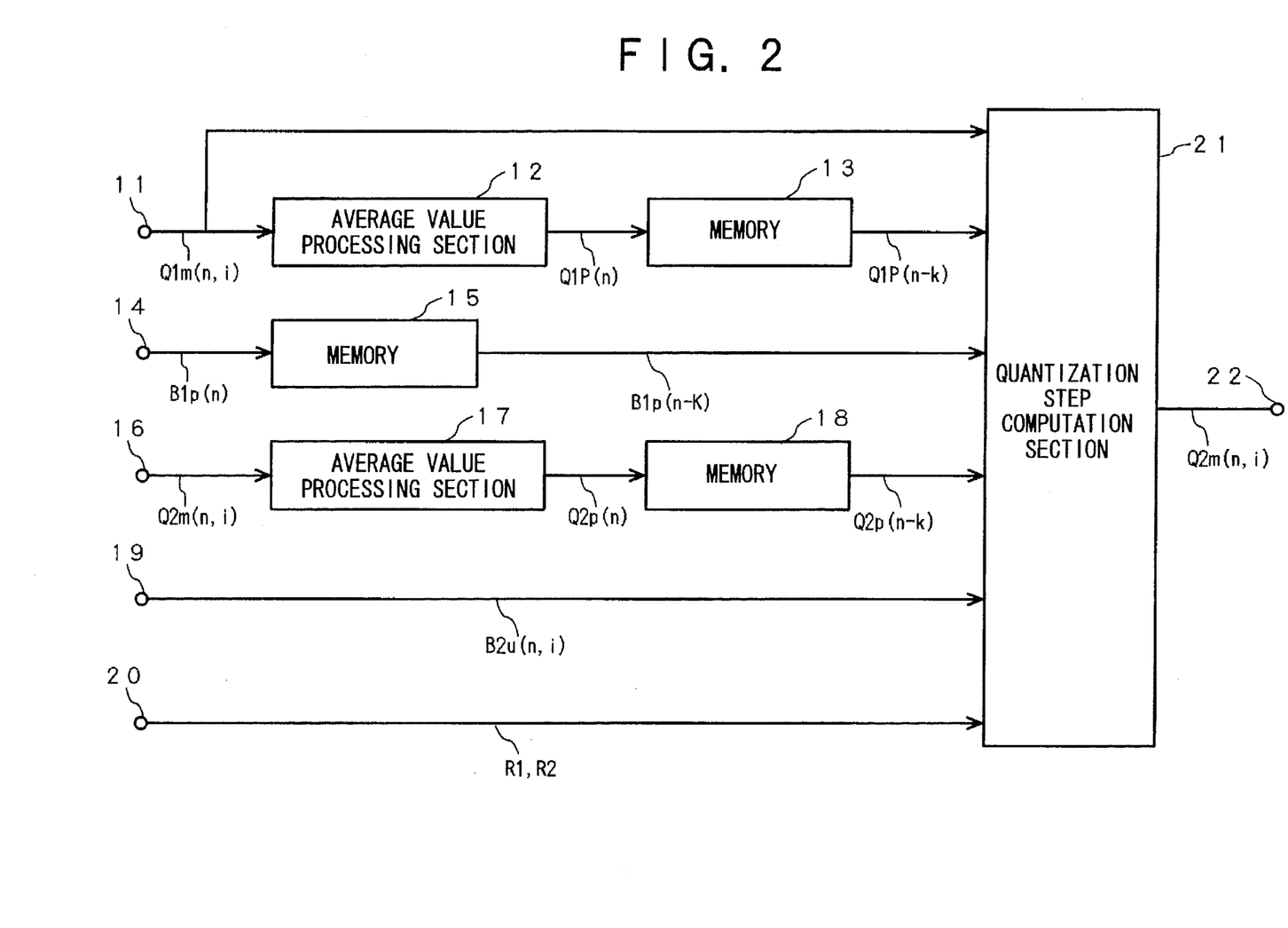
FIG. 2 is a block diagram illustrating the arrangement of a first embodiment of a quantization controller in FIG. 1.
Figure 10B:
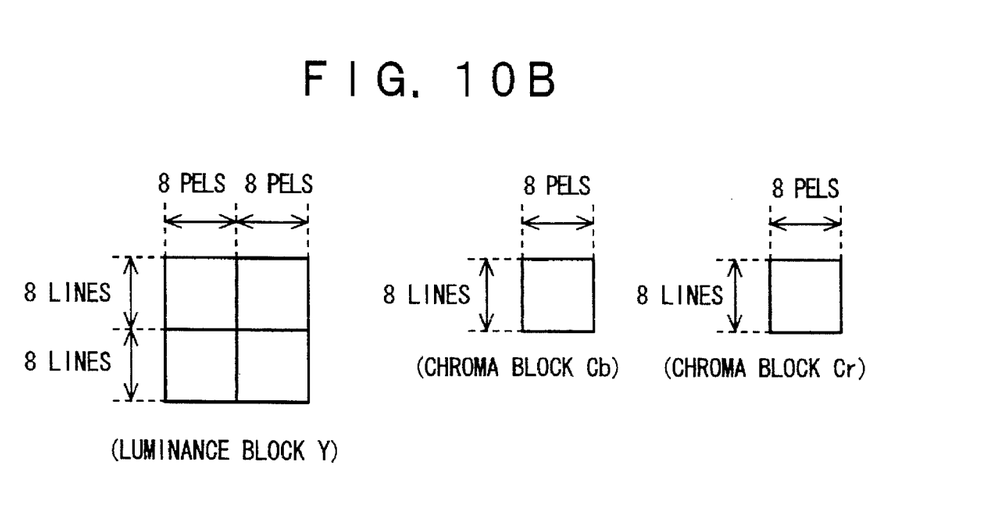

FIG. 2 is a block diagram illustrating a first embodiment of the quantization controller 5. The same reference numbers as used in FIG. 1 are also used in FIG. 2 to denote corresponding or identical components. Pre-conversion quantization step Q1m(n,i) for a block that is currently being processed is input at a quantization step input terminal 11. The n defines a frame number, and the numbering is performed in consonance with the display order for the pictures. The i defines the number of a macro block, and as is shown in FIGS. 10A and 10B, for example, the numbers are provided from the left top to the right bottom of a picture P (i=0, 1, 2, . . . T−1, where T is a complete macro block in the picture). The definitions for i and n can be applied hereafter in the same manner.

The quantization step Q1m(n,i) is sent to an average value processing section 12 as well as a quantization step computation section 21. The average value processing section 12 adds together the quantization steps of the individual macro blocks in the picture, and calculates their average value when all the picture quantization steps are received to acquire picture averaged quantization step Q1p(n). The picture averaged quantization step Q1p(n) that is output by the average value processing section 12 is stored in a memory 13. From the memory 13 is output averaged quantization step Q1p(n−k) for the latest coded picture with the same coding type. In this case, k defines a positive integer. Frame number n−k defines a number for the latest decoded picture with the same coding type as a currently processed picture n. For example, when the frame number of a currently processed picture is n=5 and the coding type is a predictive coded picture (P picture) type that is specified by the MPEG, and when the frame of the latest coded picture P is present preceding two frames, k=2 and accordingly n−k is 3, which indicates frame number 3.

Total coded bit count B1p(n) in a picture before conversion is input at a pre-conversion picture bit count input terminal 14. The coded bit count B1p(n) is stored in the memory 15. From the memory 15 is output total coded bit count B1p(n−k) for the latest coded picture with the same coding type before conversion.

Post-conversion quantization step Q2m(n,i) at a post-conversion quantization step input terminal 16 is transmitted to an average value processing section 17. The average value processing section 17 adds together the quantization steps for the macro blocks in the picture and calculates the average value when all the quantization steps in the picture are received to provide average quantization step Q2p(n) for the picture after conversion. The average quantization step Q2p(n) for the picture after conversion, which is output from the average processing section 17, is stored in a memory 18. From the memory 18 is output average quantization step Q2p(n−k) for the latest coded picture after conversion that is the same coding type.

Coded bit count B2u(n,i) up to the blocks for the picture after conversion is input at a post-conversion picture bit count input terminal 19.

The quantization step computation section 21 receives the quantization step Q1m(n,i) for a block from the quantization step input terminal 11, the picture average quantization step Q1p(n−k) from the memory 13, the pre-conversion picture coded bit count B1p(n−k) from the memory 15, the post-conversion picture average quantization step Q2p(n−k) from the memory 18, the coded bit count B2u(n,i), which is up to the block in the picture after conversion, from the post-conversion picture bit count input terminal 19, and the coding rate R1 before rate conversion and the coding rate R2 after conversion from the coding rate input terminal 20. The quantization step computation section 21 transmits quantization step Q2m(n,i) after conversion to a quantization step output terminal 22. The number "1" in Q1m, B1p, etc., designates a condition before conversion, while the number "2" in Q2p and B2u designates a condition after conversion. These conditional designations can be employed hereafter.

Figure 9:
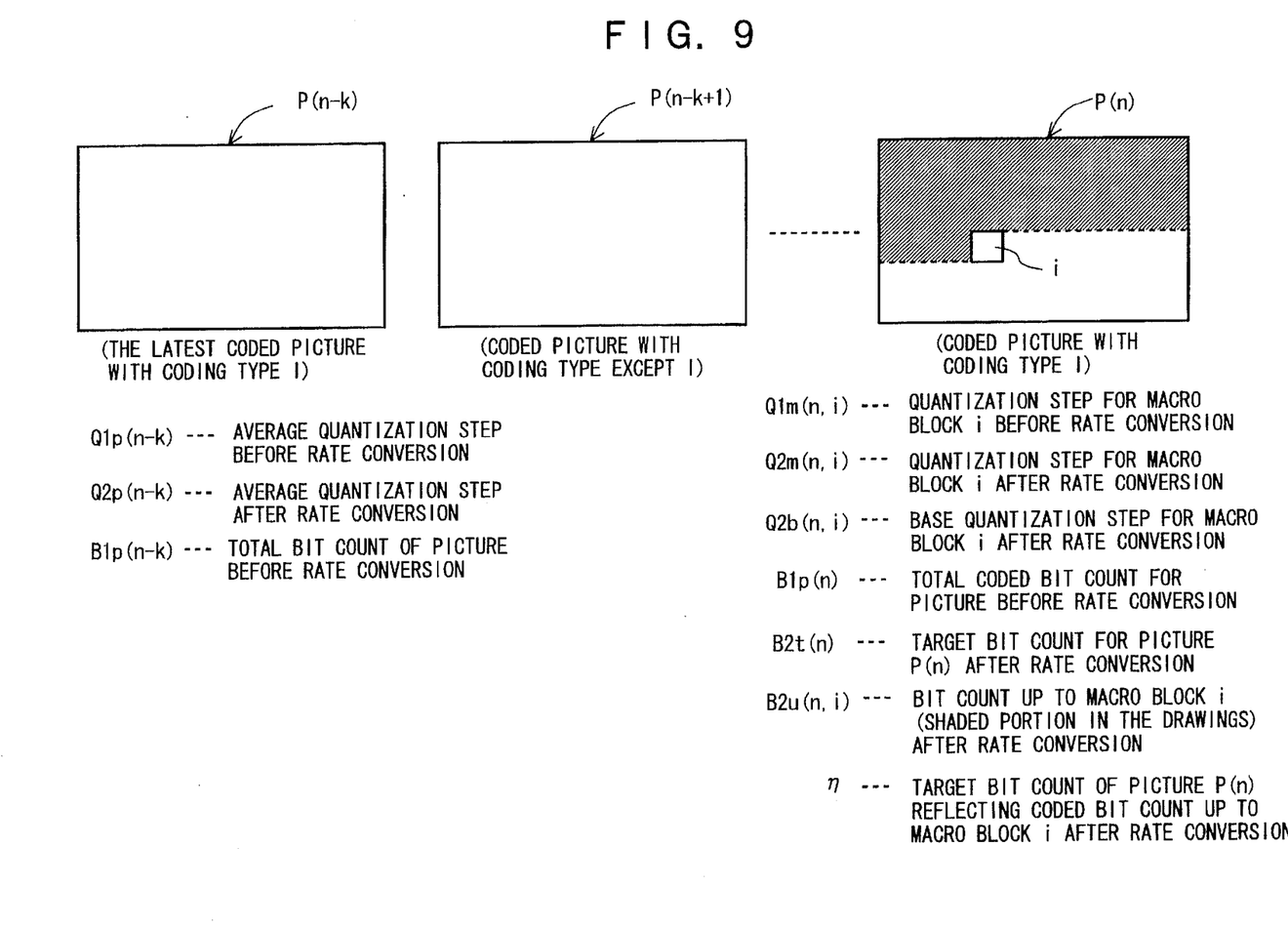
FIG. 9 is a diagram for explaining bit quantities that are employed for computation of the quantization controller.

The processing at the quantization step computation section 21 will now be explained in detail. First, the definitions of primary counts that appear in the following explanation will be described while referring to FIG. 9. Suppose that the picture is changed to P(n−k), P(n−k+1), . . . , P(n) as time elapses and that the macro block in the picture for which rate conversion is currently being performed is the ith block i in picture P(n) of the nth frame. Also, suppose that the latest coded picture with the same coding type as picture P(n) is picture P(n−k) which precedes picture P(n) by k frames. The definitions of the primary counts are as follows:

Q1p(n−k) . . . average quantization step for picture P(n−k) before rate conversion;

Q2p(n−k) . . . average quantization step for picture P(n−k) after rate conversion;

B1p(n−k) . . . total bit count of picture P(n−k) before rate conversion;

Q1m(n,i) . . . quantization step for macro block i in picture P(n) before rate conversion;

Q2m(n,i) . . . quantization step for macro block i in picture P(n) after rate conversion;

Q2b(n,i) . . . base quantization step for macro block i in picture P(n) after rate conversion;

B1p(n) . . . total coded bit count for picture P(n) before conversion;

B2t(n) . . . target bit count for picture P(n) after rate conversion;

B2u(n,i) . . . bit count up to macro block i (shaded portion in the drawings) in picture P(n) after rate conversion; and η . . . target bit count of picture P(n) reflecting coded bit count up to macro block i (shaded portion in the drawings) in the picture P(n) after rate conversion.

The quantization step computation section 21 employs the base quantization step Q2b(n,i) for the block, the quantization step Q1m(n,i) for the block before conversion, and the average quantization step Q1p(n−k), before conversion, for the latest coded picture with the same coding type as a current picture (hereafter referred to as a "latest coded picture with the same coding type") to acquire the quantization step Q2m(n,i).after conversion by function F1 as follows:

$$Q2m(n,i)=F1(Q2b(n,i), Q1m(n,i), Q1p(n-k)) \qquad \text{Eq. 1}$$

Supposing that scene is continuous, e ratio of the pre-conversion quantization step Q1m(n,i) for the block i to the pre-conversion average quantization step Q1p(n−k) for the latest coded picture with the same coding type means the characteristic of the average quantization in the picture for the block 1. For example, when the quantization step Q1m(n,i) is great relative to the average quantization step Q1p(n−k), the quantization step Q2m(n,i) after the conversion must be greater than the average quantization step after the conversion. Therefore, as is shown by equation 2 below, the function F1 can be represented as multiplication of the base quantization step Q2b(n,i) for the block i by the weighted coefficient Q1m(n,i)/Q1p(n−k). As is apparent from equation 4, the base quantization step Q2b(n,i) for the block i is a quantization step where the coded bit count up to the block i after the conversion is reflected in the average quantization step Q2p(n−k), after the conversion, for the latest coded picture with the same coding type.

$$F1(Q2b(n,i), Q1m(n,i), Q1p(n-k,i)) = \alpha Q2b(n,i) \times Q1m(n,i)/Q1p(n-k) \qquad \text{Eq. 2}$$

where α is a positive real number, and for example, α=1.

The base quantization step Q2b(n,i) for the block can be calculated with function G1 by employing the quantization step Q2p(n−k), after the conversion, for the latest coded picture with the same coding type, the target bit count B2t(n) for the picture, and the bit count B2u(n,i) up to the block after the conversion.

$$Q2b(n,i)=G1(Q2p(n-k), B2t(n), B2u(n,i)) \qquad \text{Eq. 3}$$

B2t(n)/η, the ratio of the target bit count B2t(n) for the picture to the target bit count η for the picture that reflects the coded bit count up to the block after the conversion, indicates the characteristic of the quantization that reflects a bit count that can be used in the block. When, for example, η is greater than B2t(n), the already coded bit count is greater than is expected, and thus the base quantization step must be increased. As the base of the quantization step after the conversion, the average quantization step Q2p(n−k), after the conversion, of the latest coded picture with the same coding type can be used. Therefore, as is shown by equation 4, the function G1 can be depicted as the multiplication of the quantization step Q2p(n−k) by the weighted coefficient B2t(n)/η:

$$G1(Q2p(n-k), B2t(n), B2u(n,i)) = Q2p(n-k) \times B2t(n)/\eta \quad \text{Eq. 4}$$

The change in the used bit count up to the block i is obtained from B2t(n)xi/T−B2u(n,i), while yields the difference between the bit count B2t(n)xi/T, for use up to the block i, and the bit count B2u(n,i), which is obtained by actual coding. When, for example, B2t(n) is 100 kbits, i is 20, and T is 40, the bit count that is to be used is 50 kbits. When the bit count B2u(n,i) that is obtained by actual coding is 60 kbits, it indicates that the actual coded bit count has exceeded the bit count that is to be used. Therefore, as is shown by equation 5, η can be acquired by adding the change in the value of the used bit count up to the block to the target bit count B2t(n) for the picture:

$$\eta = (B2t(n) + B2t(n)xi/T - B2u(n,i)) \quad \text{Eq. 5}$$

Further, B2t(n) can be acquired as follows, with function H1 by employing the bit count B1p(n−k), for the latest coded picture with the same coding type as a current picture, and the coding rates R1, before the conversion, and R2, after the conversion:

$$B2t(n) = H1(B1p(n-k), R1, R2) \quad \text{Eq. 6}$$

The function H1 can be obtained by multiplying the total bit count B1p(n−k) of the latest coded picture with the same coding type by rate conversion ratio R2/R1:

$$H1(B1p(n-k), R1, R2) = \epsilon B1p(n-k) \times R2/R1 \quad \text{Eq. 7}$$

where $\epsilon$ is a positive real number and, for example, $\epsilon=1$. As the conclusion, the quantization step Q2m(n,i) after the conversion can be acquired with equation 8, as follows, by employing the quantities that are received by the quantization step computation section 21 in FIG. 2:

$$\begin{aligned} Q2m(n,i) &= \alpha Q2b(n,i) \times Q1m(n,I)/Q1p(n-k) \\ &= Q2p(n-k) \times B2t(n)/\eta \times Q1m(n,i)/Q1p(n-k) \\ &= Q2p(n-k) \times B2t(n)/\{B2t(n) + B2t(n) \times i/t - B2u(n,i)\} \times Q1m(n,i)/Q1p(n-k) \end{aligned} \quad \text{Eq. 8}$$

It should be noted that $B2t(n) = \epsilon B1p(n-k) \times R2/R1$.

According to this embodiment, in the above described manner, the quantization step Q2m(n,i) for the block i, after the conversion that is output by the quantization step computation section 21, can be acquired by using data that are input to the quantization step computation section 21. In this embodiment, unlike the conventional DCT coefficient partitioning where a part of the DCT coding information is deleted, the inverse quantization is performed for the DCT coding information by the inverse quantizer 3, and rate conversion is performed for the resultant information based on the quantization step Q, which is obtained by the quantization step computation section 21. Thus, the rate conversion can be performed with less image deterioration than in the DCT coefficient partitioning. In addition, the quantization step computation section 21 acquires the quantization step Q for the block i of the frame n, while taking into account the bit count up to the block i in the frame n that the block i belongs to, and the quantities of latest coded pictures (n−k) with the same coding type. Therefore, efficient rate conversion that matches the requirement of a system can be performed.

Figure 3:
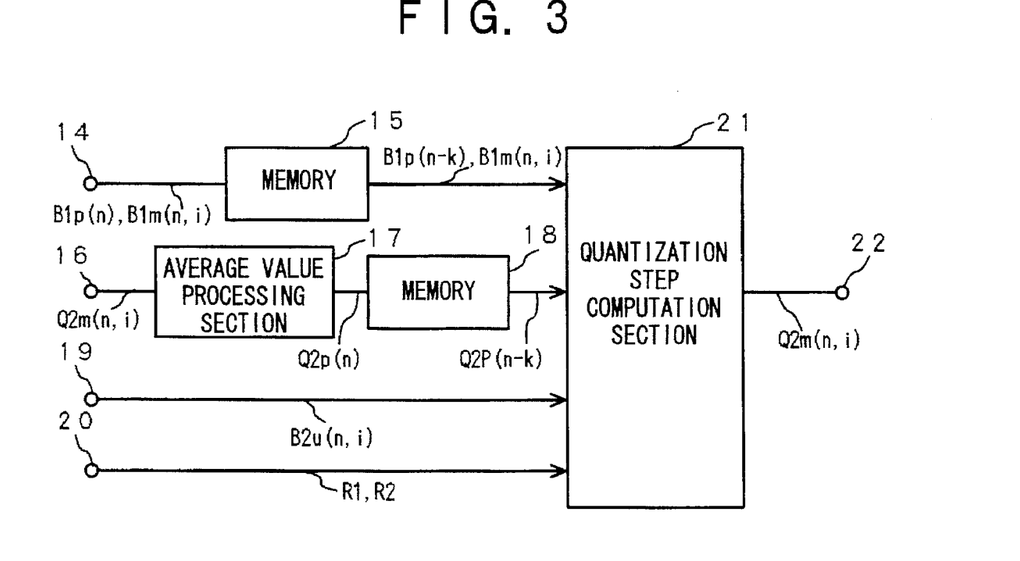
FIG. 3 is a block diagram illustrating the arrangement of a second embodiment of the quantization controller in FIG. 1.

A second embodiment of the present invention will now be described while referring to FIG. 3. FIG. 3 is a block diagram illustrating a second embodiment of the quantization controller 5 in FIG. 5. The same reference numbers as used in FIG. 2 are used to denote corresponding or identical components.

In FIG. 3, coded bit count B1p(n), for the picture before the conversion, and coded bit count B1m(n,i), for the block i before the conversion, are input at a pre-conversion picture bit count input terminal 14. These data are stored in a memory 15. Quantization step after conversion, Q2m(n,i), is input via a post-conversion quantization step input terminal 16 and from a memory 18 is output averaged quantization step Q2p(n−k), after the conversion, of the latest coded picture with the same coding type.

Coded bit count B2u(n,i), up to the block i of the picture after the conversion, is input via a post-conversion picture bit count input terminal 19. A quantization step computation section 21 receives, from the memory 15, the coded bit count B1p(n−k), for the picture before the conversion, and the bit count B1m(n,i), for the block i before the conversion; from the post-conversion picture bit count input terminal 19, the coded bit count B2u(n,i), up to the block i, for the picture after the conversion; and, from a coding rate input terminal 20, coding rate R1, before the conversion, and coding rate R2, after the conversion. The quantization step computation section 21 outputs post-conversion quantization step Q2m(n,i) to a quantization step output terminal 22.

The quantization step computation section 21 employs the base quantization step Q2b(n,i) for the block i, the bit count B1m(n,i) for the block i before the conversion, and the bit count B1p(n−k), before the conversion, of the latest coded picture with the same coding type to acquire the quantization step Q2m(n,i) after the conversion by using function F3 as follows:

$$Q2m(n,i) = F3(Q2b(n,i), B1m(n,i), B1p(n-k)) \quad \text{Eq. 9}$$

T×B1m(n,i)/B1p(n−k), the ratio of the bit count of a picture, which is T times the bit count B1m(n,i) for the block i before conversion, to the bit count B1p(n−k), before the conversion of the latest coded picture with the same coding type shows the characteristic of the quantization that reflects the bit count of the block i. When, for example, T×B1m(n,i) is greater than B1p(n−k), the coded bit count of the block is greater than average, and thus the quantization step must be increased. Therefore, the function F3 can be represented as the multiplication of the base quantization step Q2b(n,i) by the weighted coefficient T×B1m(n,i)/B1p(n−k), as is shown by equation 10:

$$F3(Q2b(n,i), B1m(n,i), B1p(n-k)) = \beta Q2b(n,i) \times T \times B1m(n,i)/B1p(n-k) \quad \text{Eq. 10}$$

where $\beta$ is a positive real number and, for example, $\beta=1$; and where T indicates the total block count in the picture. The base quantization step Q2b(n,i) for the block i can be acquired in the same manner as in the first embodiment.

The second embodiment differs from the first embodiment in that the base quantization step Q2b(n,i) is multiplied by the weighted coefficient T×B1m(n,i)/B1p(n−k). As well as the first embodiment, however, the rate conversion can be performed with less image deterioration than that which occurs with the DCT coefficient partitioning.

Figure 4:
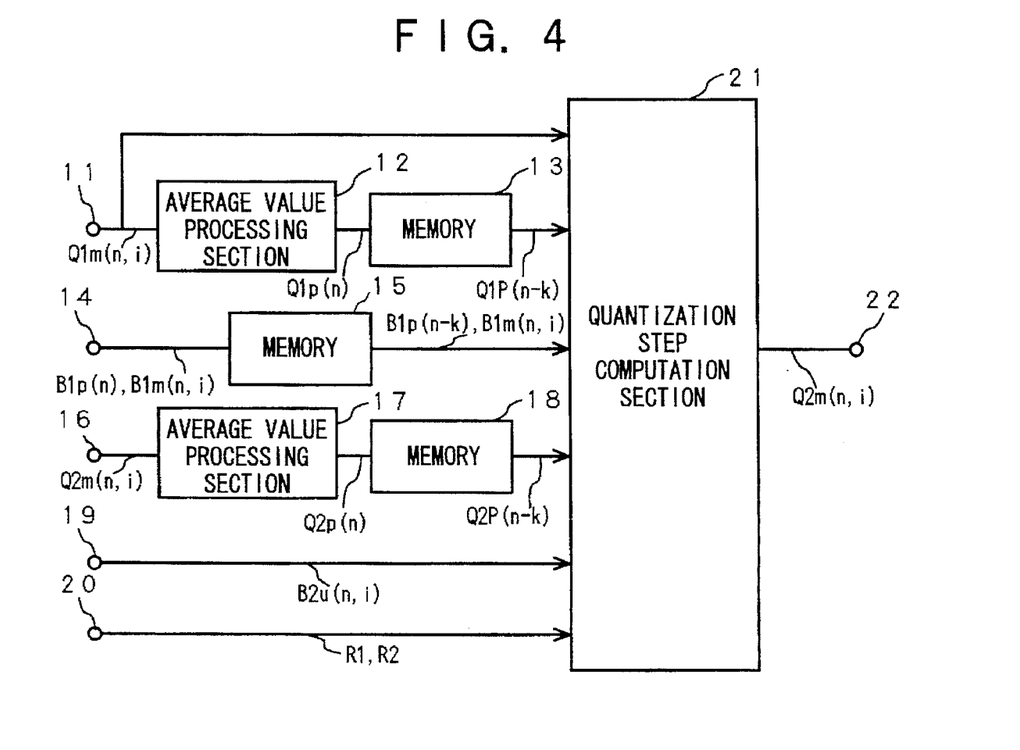
FIG. 4 is a block diagram illustrating the arrangement of a third embodiment of the quantization controller in FIG. 1.

A third embodiment of the present invention will now be described while referring to FIG. 4. FIG. 4 is a block diagram illustrating a third embodiment of the quantization controller 5 in FIG. 1. The same reference numbers as used in FIG. 2 are employed to denote corresponding or identical components.

In FIG. 4, quantization step $Q1m(n,i)$ for a block that is currently being processed is input at a quantization step input terminal 11. The quantization step $Q1m(n,i)$ is transmitted not only to a quantization step computation section 21 but also to an average value processing section 12. The average value processing section 12 adds together the quantization steps of the blocks in the picture, and calculates an average value when all the quantization steps in the picture are received, so that average quantization step $Q1p(n)$ for the picture is acquired. The picture average quantization step $Q1p(n)$ is transmitted from the average value processing section 12 and stored in a memory 13.

Coded bit count $B1p(n)$ for the picture before the conversion and coded bit count $B1m(n,i)$ for the block i are input at a pre-conversion picture bit count input terminal 14. These data are stored in a memory 15. Quantization step $Q2m(n,i)$, after the conversion, is input at a post-conversion quantization step input terminal 16. From a memory 18 is output average quantization step $Q2p(n-k)$, after the conversion, of the latest coded picture with the same coding type. Coded bit count $B2u(n,i)$, up to the block i in the picture after the conversion, is input at a post-conversion picture bit count input terminal 19.

A quantization step computation section 21 receives, from the quantization step input terminal 11, the block quantization step $Q1m(n,i)$; from the memory 13, the picture average quantization step $Q1p(n-k)$; from the memory 15, the coded bit count $B1p(n-k)$ for the picture before the conversion and the bit count $B1m(n,i)$ for the block i before the conversion; from the post-conversion picture bit count input terminal 19, the coded bit count $B2u(n,i)$, up to the block i, for the picture after the conversion; and, from a coding rate input terminal 20, coding rate R1 before the conversion and coding rate R2 after the conversion. The quantization step computation section 21 outputs post-conversion quantization step $Q2m(n,i)$ to a quantization step output terminal 22.

The quantization step computation section 21 employs the base quantization step $Q2b(n,i)$ for the block i, estimated activity $Am(n,i)$ for the block i, and estimated activity $Ap(n-k)$ for each block in the latest coded picture with the same coding type to acquire the quantization step $Q2m(n,i)$ after the conversion by using function F4 as follows:

$$Q2m(n,i)=F4(Q2b(n,i), Am(n,i), Ap(n-k)) \qquad \text{Eq. 11}$$

$Am(n,i)/Ap(n-k)$, the ratio of the estimated activity $Am(n,i)$ for the block i to the estimated activity $Ap(n-k)$ for each block in the latest coded picture with the same coding type indicates the characteristic of the quantization that reflects the activity of the block i. When, for example, the activity of the block i, $Am(n,i)$, is greater than the picture-averaged activity $Ap(n-k)$, the coded bit count for the block is greater than average, and thus the quantization step must be increased. Therefore, the function F4 can be represented as the multiplication of the base quantization step $Q2b(n,i)$ by the weighted activity coefficient $Am(n,i)/Ap(n-k)$, as is shown by equation (12):

$$F4(Q2b(n,i), Am(n,i), Ap(n-k)) = \gamma Q2b(n,i) \times Am(n,i)/Ap(n-k) \quad \text{Eq. 12}$$

where $\gamma$ is a positive real number and, for example, $\gamma=1$.

The base quantization step $Q2b(n,i)$ for the block i can be acquired in the same manner as in the first embodiment.

Further, the estimated activity $Am(n,i)$ of the block i can be acquired with function H1 by employing the quantization step $Q1m(n,i)$ for the block i before the conversion and the bit count $B1m(n,i)$ for the block i before the conversion:

$$Am(n,i)=H1(Q1m(n,i), B1m(n,i)) \qquad \text{Eq. 13}$$

The estimated activity $Ap(n-k)$ for each block in the latest coded picture can be acquired with function H2 by employing the average quantization step $Q1p(n-k)$ before the conversion for the latest coded picture, and the total bit count $B1p(n-k)$ for that picture:

$$Ap(n-k)=H1(Q1p(n-k), B1p(n-k)/CB) \qquad \text{Eq. 14}$$

where CB indicates the number of blocks that are coded in the picture.

Figure 5:
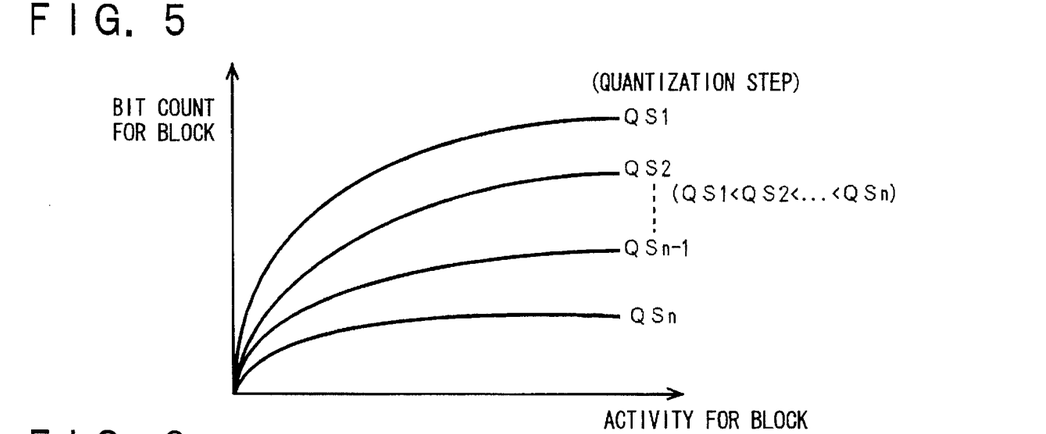
FIG. 5 is a graph showing a relationship between a block activity and a coded block count.
Figure 6:
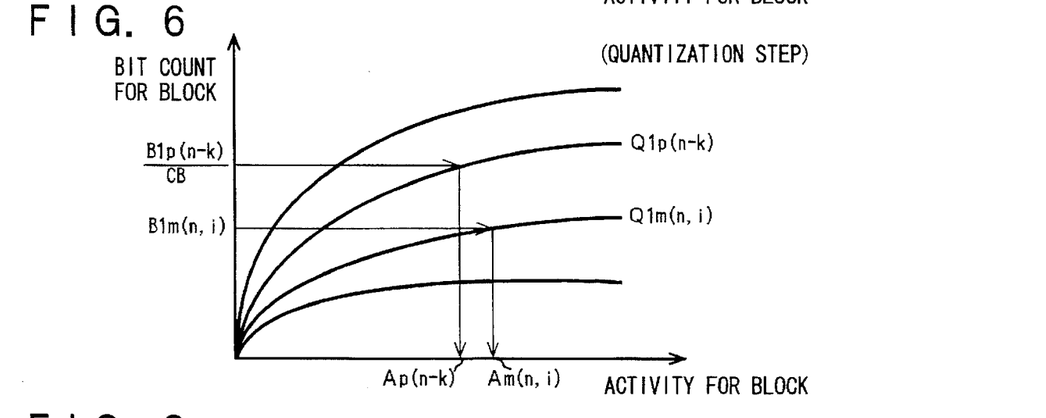
FIG. 6 is an explanatory graph for acquiring a block activity from a coded block count by referring to FIG. 5.

One example graph of the functions H1 and H2 is shown in FIG. 5. This graph shows the relationship between the activity for each block and the bit count for each block by employing the quantization step as a parameter. FIG. 6 is an example graph for acquiring $Am(n,i)$ by using the relationship shown in FIG. 5. First, acquired as the estimated activity $Am(n,i)$ for the block is the activity at the intersection of the bit count $B1m(n,i)$, for the block before the conversion, on the graph of the quantization step that corresponds to the quantization step $Q1m(n,i)$, before the conversion. Acquired as the estimated activity $Ap(n-k)$, for each block of the latest coded picture, is the activity at the intersection of the average bit count $B1p(n-k)/CB$, for the latest coded picture, on the graph that corresponds to the average quantization step $Q1p(n-k)$ for that picture before conversion.

The graph shown in FIG. 5 can, for example, be obtained as follows. First, the quantization step is fixed at the available minimum value and a picture is coded. At this time, the generated bit count and the activity for a block are measured and sorted according to picture coding modes (I, P, and B pictures) that are used by the MPEG. The activity can be acquired, for example, as a mean square error of a luminance signal in a block with resect to the average luminance in the block. The measuring of the activity relative to the generated bit count is performed for a plurality of pictures and a graph of the bit count relative to the activity is prepared for each coding mode. Then, the quantization step is increased, and the same process is performed to prepare a graph concerning the quantization step. This process is repeated up to the maximum quantization step.

Figure 7:
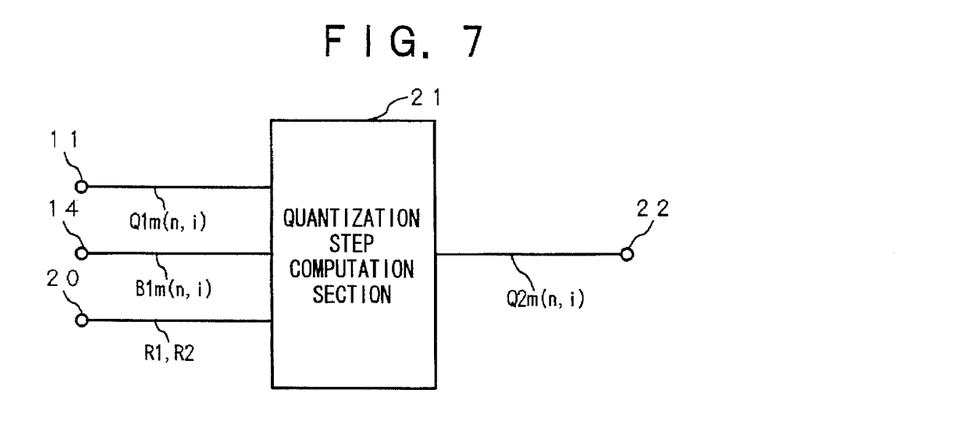
FIG. 7 is a block diagram illustrating the arrangement of a fourth embodiment of the quantization controller in FIG. 1.

A fourth embodiment of the present invention will now be described while referring to FIG. 7. FIG. 7 is a block diagram illustrating a fourth embodiment of the quantization controller 5 in FIG. 1. The same reference numbers as used in FIG. 2 are employed to denote corresponding or identical components.

In FIG. 7, quantization step $Q1m(n,i)$ for a block that is currently being processed is input via a quantization step input terminal 11. Coded bit count $B1m(n,i)$ for a block 1 before the conversion is input via a pre-conversion picture bit count input terminal 14. A quantization step computation section 21 receives the quantization step $Q1m(n,i)$ for the block from the quantization step input terminal 11; the coded bit count $B1m(n,i)$ for the block i, before the conversion, from the pre-conversion picture bit count input terminal 14; and coding rate R1, before the conversion, and coding rate R2, after the conversion from a coding rate input terminal 20. The quantization step computation section 21 outputs post-conversion quantization step $Q2m(n,i)$ via a quantization step output terminal 22.

The quantization step computation section 21 employs estimated activity Am(n,i) for the block i and estimated bit count B2m(n,i) for the block i after the conversion to acquire the post-conversion quantization step Q2m(n,i) by using function F5 as follows:

$$Q2m(n,i) = F5(Am(n,i), B2m(n,i)) \quad \text{Eq. 15}$$

The estimated activity Am(n,i) for the block i can be acquired using function H1 by employing the quantization step Q1m(n,i) for the block i before the conversion, and the bit count B1m(n,i) for the block i before the conversion as follows:

$$Am(n,i) = H1(Q1m(n,i), B1m(n,i)) \quad \text{Eq. 16}$$

The estimated bit count B2m(n,i) for the block i after the conversion can be acquired by employing the bit count B1m(n,i) of the block i before the conversion, the coding rate R1 before the rate conversion, and the coding rate R2 after the rate conversion as follows:

$$B2m(n,i) = \delta B1m(n,i) \times R2/R1 \quad \text{Eq. 17}$$

where $\delta$ indicates a positive real number and, for example, $\delta = 1$.

Figure 8:
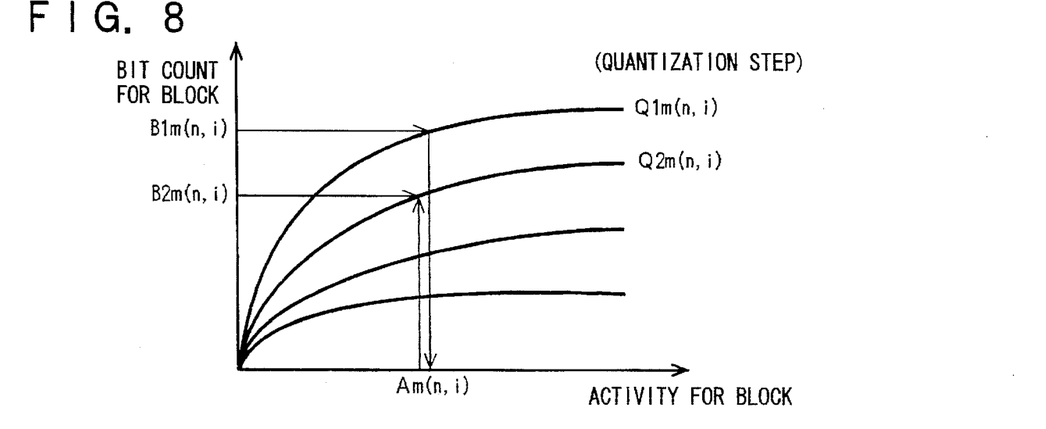
FIG. 8 is an explanatory graph for acquiring a quantization step from a block activity and a coded block count by referring to FIG. 5.

The functions F5 and H1 can be acquired by referring to FIG. 5 as an example. FIG. 8 is a graph for acquiring Am(n,i) and Q2m(n,i) using the relationship shown in FIG. 5. First, acquired as the estimated activity Am(n,i) for the block is the activity at the intersection of the bit count B1m(n,i) for the block, before the conversion, on the graph of the quantization step that corresponds to the quantization step Q1m(n,i), before the conversion. Then, acquired as the quantization step after the conversion, Q2m(n,i), is a quantization step at the intersection, or nearby, that is formed with the estimated activity Am(n,i) and the estimated bit count B2m(n,i).

(Modification)

The present invention is not limited to the above described embodiments, but can be variously modified. First, when the variable length coding process is not performed after the quantization process, and when the other coder and decoder are provided for coding, the variable length coder and the variable length decoder in the example arrangement in FIG. 1 can be replaced by a coder and a decoder.

In addition, the present invention can be employed for moving picture coding systems and still picture coding systems, such as the H.261 system of the ITU-T and the JPEG system, other than the MPEG.

Further, as for the picture average quantization step Q1p(n−k) that is acquired in frame n−k, which indicates the number of the latest coded picture, the coded bit count B1p(n−k) for the picture before the conversion, and the estimated activity Ap(n−k, i) for each block for the latest coded picture, k=1 that indicates the latest frame and k=0 that indicates the current frame can be employed for the purpose of simplifying the processing.

Q1m(n,i)/Q1p(n−k) in equation 2 can be changed to an easy term as a function for calculating the quantization step. For example, constant "1" can be used as a simple weighted value. At this time, the function for calculating the quantization step Q2m(n,i) is the function for the base quantization step Q2b(n,i). In this case, the performance after the rate conversion may be slightly deteriorated compared with that in the above described embodiments.

Although in the graph in FIG. 5, the relationship between the bit count and the activity in FIG. 5 is shown for each picture coding mode (I, P, or B picture) that is used in the MPEG, for example, a graph for a specific coding mode can be employed as a representative model, or an averaged graph of all the coding modes can be used as a representative model. When a system other than the MPEG is employed, a graph can be prepared according to that system.

When the variable length decoder 2 and the variable length coder 7 in FIG. 1 are changed so as to enable them to cope with a different system, they can be used as system converters that perform conversion for different systems and rate conversions. For example, data that are coded at 2 Mbit/s by the MPEG2 system can be converted into data at 1 Mbit/s, which are in turn changed into data at 1 Mbit/s for the MPEG1 system by a variable length decoder of the MPEG1 system, or the coded data at 1 Mbit/s for the MPEG1 system can be converted into data at 1 Mbit/s for the H.261 system.

As is apparent from the above description, according to the present invention, since rate conversion is basically performed by employing the quantizer and the inverse quantizer, the DCT and the IDCT, which require an enormous amount of processing, are not necessary, and as a memory with a large capacity is not therefore required, the present invention can be achieved with a simple structure. The performance of the present invention is the equivalent of transcoding. Since the DCT coefficient partitioning does not require quantization and inverse quantization, slightly less processing is required for the employment of that system than is required with the present invention; however, the performance of the DCT coefficient partitioning is substantially degraded compared with the present invention.

In the present invention, a picture that was coded with the MPEG1 system was processed. When the processing in the first embodiment was performed for "Flower Garden" and "Mobile Calendar," which are used as test pictures by the ISO, it was confirmed that, while the amount of processing was considerably reduced compared with that which is required for that transcoding during which data are decoded to obtain a picture and then the picture is coded again, an SN ratio that is substantially the same as that for transcoding could be acquired. In addition, when compared with the DCT coefficient partitioning, it was confirmed that, although the amount of processing was not much different, the coding performance could be improved by up to 8 dB.

What is claimed is:

1. A coding rate conversion method, for converting a coding rate of a moving picture data coded once, wherein the moving picture data is decoded by a variable-length decoder providing decoded data, said decoded data is inversely quantized providing inversely quantized data, said inversely quantized data is subject to quantization step control providing re-quantized data, and said re-quantized data is variable-length coded, whereby a rate conversion is performed at a quantization level.

2. In a coding rate conversion apparatus, for converting a coding rate of moving picture data coded once, means for converting the coding rate of coded data for the moving picture comprising:

. means for decoding the coded data for the moving picture by a variable-length decoder;

means for inversely quantizing the data decoded by said variable-length decoder;

means for re-quantizing said inversely quantized coded data; and quantization control means for controlling a quantization step that is required for said re-quantization.

3. A rate conversion apparatus according to claim 2, wherein said quantization control means controls said re-quantization of a target block by using an average quantization step before and after a conversion of a picture that is coded in a like manner or is already coded.

4. A rate conversion apparatus according to claim 2, wherein said quantization control means controls said re-quantization of said target block by employing a base quantization step for said target block that is obtained by reflecting, at said average quantization step after said conversion of said picture that is coded in a like manner or is already coded, a bit count after said conversion up to said target block in a frame for a moving image.

5. A rate conversion apparatus according to claim 2, wherein, according to a ratio of said quantization step, for said target block before said conversion, to said average quantization step before said conversion of said picture that is coded in a like manner or is coded already, said quantization control means weighs said base quantization step for said target block, which is obtained by reflecting, at said average quantization step after said conversion of said picture that is coded in a like manner or is coded already, said bit count after a conversion up to said target block in said frame of said moving picture, and thus acquires a quantization step that is necessary for re-quantization so as to control said re-quantization of said target block.

6. A rate conversion apparatus according to claim 2, wherein, according to a ratio of a bit count, before said conversion of said picture that is coded in a like manner or is coded already, to a bit count that is obtained by calculating for a picture a bit count of said target block before said conversion, said quantization control means weighs said base quantization step for said target block, which is obtained by reflecting, at said average quantization step after said conversion of said picture that is coded in a like manner or is coded already, said bit count after said conversion up to said target block in said frame of said moving picture, and thus acquires a quantization step that is necessary for re-quantization so as to control said re-quantization of said target block.

7. A rate conversion apparatus according to claim 2, wherein, according to a ratio of an estimated activity for said target block, to an estimated activity for each block of said picture that is coded in a like manner or is coded already, said quantization control means weighs said base quantization step for said target block, which is obtained by reflecting, at said average quantization step after said conversion of said picture that is coded in a like manner or is coded already, said bit count after said conversion up to said target block in said frame of said moving picture, and thus acquires a quantization step that is necessary for re-quantization so as to control said re-quantization of said target block.

8. A rate conversion apparatus according to claim 7, wherein said estimated activity for each block, for said picture that is coded in a like manner or is coded already, is acquired by said average quantization step before said conversion of said picture that is coded in a like manner or is coded already and a total bit count for said picture, and wherein said estimated activity, for said target block, is acquired by said quantization step for said target block before said conversion and said bit count for said target block before said conversion.

9. A rate conversion apparatus according to claim 2, wherein, for control of said re-quantization of said target block, said quantization control means acquires said quantization step, which is necessary for said re-quantization by said estimated activity and said estimated bit count after said conversion of said target block in said frame of said moving picture.

* * * * *